Patented Dec. 16, 1947

2,432,905

UNITED STATES PATENT OFFICE 2,432,905

N-SUBSTITUTED PHTHALIMIDES AND THEIR SYNTHESIS

Morris S. Kharasch and Charles F. Fuchs, Chicago, Ill., assignors to Eli Lilly and Company, Indianapolis, Ind., a corporation of Indiana No Drawing. Original application January 4, 1943, Serial No. 471,294. Divided and this application July 25, 1946, Serial No. 686,142

14 Claims. (Cl. 260—326)

The present application is a division of our copending application Serial No. 471,294, filed January 4, 1943; now become Patent No. 2,409,287, granted October 15, 1946.

It is the object of our invention to provide a new and simple synthesis for substances which provide the side chains of various useful final products, including anti-malarials and other useful medicinal products; and to produce various new substances by that synthesis.

Four steps are involved in this synthesis. Each of the first, third, and fourth steps results in substances which as a class have not been previously prepared, and are new with us. The second step results in substances which as a class have not been previously prepared, and are new with us, except for one species.

Although this application describes all four steps, to show the complete synthesis, the claims of this application are limited to the third step and to the substances produced by that third step; and other steps, and substances produced by them, form the subject-matter of co-pending applications which we have filed, including the aforesaid application Serial No. 471,294 of which the present application is a division.

These four steps respectively produce products as follows:

*First step.*—Production of unsaturated amines, of the class consisting of amines having the following general formula:

(1)
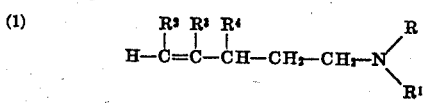

in which R and $R^1$ represent radicals of the class consisting of (a) alkyl radicals which together have not to exceed 8 carbon atoms, and (b) alicyclic radicals, and $R^2$, $R^3$, and $R^4$ each represents a member of the class consisting of hydrogen and alkyl radicals of not to exceed 3 carbon atoms, having the following general formula:

(2)
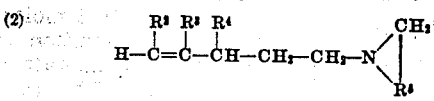

in which $R^5$ represents a polymethylene radical which has not less than 3 and not more than 4 carbon atoms, and $R^2$, $R^3$, and $R^4$ have the same meaning as before. All these unsaturated amines are new.

*Second step.*—Production of saturated halides, of the class consisting of halides having the following general formula:

(3)
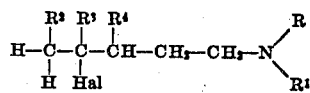

and of halides having the following general formula:

(4)
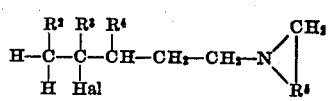

in which R, $R^1$, $R^2$, $R^3$, $R^4$, and $R^5$ have the same significance as before, and Hal represents one of the halogens chlorine and bromine. All these saturated halides are new except the single instance where R and $R^1$ are each ethyl groups and $R^2$, $R^3$, and $R^4$ are all hydrogen atoms.

*Third step.*—Production of phthalimido derivatives, of the class consisting of phthalimido derivatives having the following general formula:

(5)
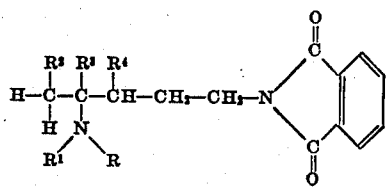

and of phthalimido derivatives having the following general formula:

(6)
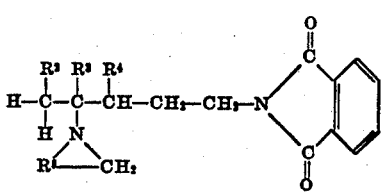

in which R, $R^1$, $R^2$, $R^3$, $R^4$, and $R^5$ have the same significance as before. All these phthalimido derivatives are new.

*Fourth step.*—Production of saturated diamines, of the class consisting of diamines having the following general formula:

(7) 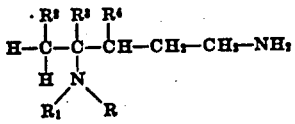

and of diamines having the following general formula:

(8) 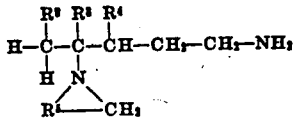

in which R, $R^1$, $R^2$, $R^3$, $R^4$, and $R^5$ have the same significance as before. All these saturated diamines are new. These saturated diamines are the final products of the present synthesis; but they are intermediates which are useful to produce various products; such for instance as atabrine or plasmochin when R and $R^1$ each represents an ethyl group and $R^2$, $R^3$, and $R^4$ all represent hydrogen atoms.

The procedures involved in the four steps are in general as follows:

*Step 1.—Preparation of unsaturated amines*

This synthesis is by the following general course:

An allyl halide (chloride or bromide), or substituted allyl halide with an alkyl substituent of not to exceed 3 carbon atoms on one or more of its carbon atoms, is caused to react with magnesium, in ether or dioxane or other appropriate solvent, to produce the corresponding Grignard reagent, according to the following equation:

(9) 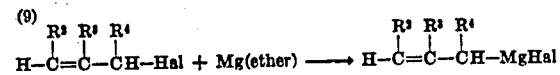

in which $R^2$, $R^3$, $R^4$, and Hal have the same significance as before. When Hal is bromine, the Grignard reagent is soluble in ether; but when Hal is chlorine the Grignard reagent is insoluble in ether. For that reason chemists in general have preferred to use such Grignard reagents when Hal is bromine, because a seemingly unworkable solid mass separated out when Hal was chlorine. As a matter of fact, it has not even been established heretofore that the solid which separates is a pure Grignard reagent, or (what is more important) that it can be used in syntheses. We have found, however, that these solids are Grignard reagents, and highly effective ones, superior in many respects (in that better yields are obtained) to the corresponding Grignard reagents when Hal is bromine. This superiority, coupled with the low cost of the organic chlorides as compared with the organic bromides, makes our synthesis especially attractive commercially when allyl chlorides or substituted-allyl chlorides are used.

The Grignard reagent thus obtained is caused to react with a 1-chloro-2-substituted aminoethane, according to one or the other of the two following equations:

(10) 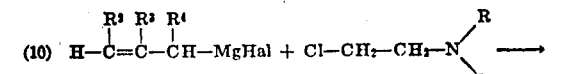

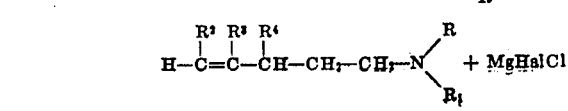

(11) 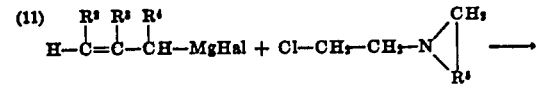

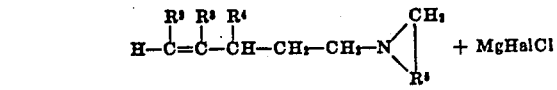

in which R, $R^1$, $R^2$, $R^3$, $R^4$, $R^5$, and Hal have the same significance as before.

When Hal is chlorine, it is found that the yields are greater than when Hal is bromine; but our invention contemplates the use of either.

The product obtained by Equation 10 or 11 above is our unsaturated amine, of Formula 1 or 2 above. All species of it are believed, after a careful search, to be new with us.

In the preparation of the unsaturated amine, it is possible to carry the whole procedure out in one step, by dissolving the allyl halide or substituted allyl halide (preferably the chloride) and the 1-chloro-2-dialkylaminoethane in ether, and allowing them to react with magnesium. The magnesium is conveniently suspended in the ether first, and a mixture of the two reactants dropped into that ether. It is possible that in this procedure the reactions of Equations 9 and 10 or 9 and 11 take place seriatim; but in any case reaction occurs to give the desired unsaturated amine in very high yields.

*Step 2.—Preparation of saturated halides; by addition of hydrogen halide to double bond of unsaturated amines produced by Step 1*

This synthesis is by the following general course:

An unsaturated amine of Formula 1 or 2, as produced by Step 1, is caused to react, in the presence of small quantities of ferric or aluminum chloride or bromide, with an anhydrous halogen halide in which the halogen is either bromine or chlorine. Chlorine is preferred. An addition of the halogen acid takes place at the double bond, to form the onium hydrohalide of the desired saturated halide, according to one or the other of the two following equations:

(12) 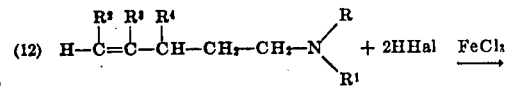

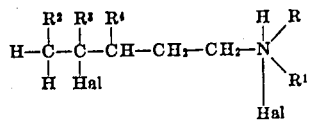

(13) 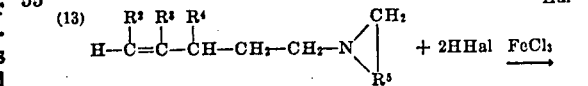

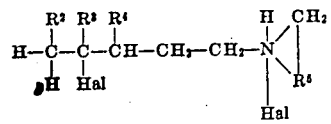

in which R, $R^1$, $R^2$, $R^3$, $R^4$, $R^5$, and Hal have the same significance as before. In order to speed up the addition, we prefer to use an excess of the hydrogen halide over the 2 moles shown in the equation, conveniently about 2.1 to 3 moles. Furthermore, we prefer to cause this addition to take place at a somewhat elevated temperature (40° to 50° C.) in a closed system. This saturated halide is most conveniently kept in the form of the onium hydrohalide, in which form it is isolated. To obtain it as the free base, it is treated with an inorganic base, such as sodium hydroxide, to yield the saturated halide of Formula 2 above.

So far as we can discover after careful search, all the species of this saturated halide are new, as has been stated above, except the single species where R and $R^1$ are both ethyl groups and $R^2$, $R^3$, and $R^4$ are all hydrogen atoms.

*Step 3.—Preparation of phthalimido derivatives of saturated halides of Step 2*

This synthesis is by the following general course:

The saturated halide of Formula 3 or 4, as produced by Step 2, desirably with Hal representing chlorine, is treated with potassium or sodium phthalimide—preferably in a suitable solvent, such as xylene or methyl naphthalene, and heated to 150° to 165° C. (bath temperature) for several hours. A reaction occurs which at first was thought to be according to one or the other of the two following equations:

(14)
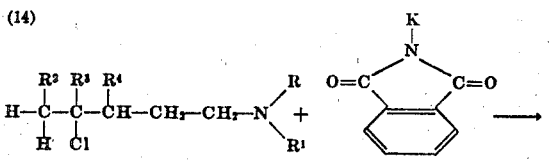

(15)
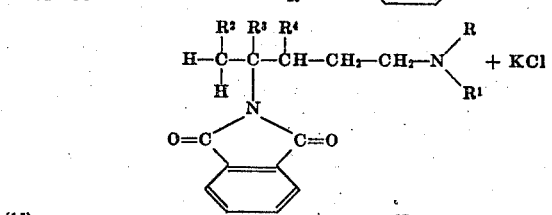

It was found later, however, that the reaction was not quite so simple as that, and that a rearrangement occurred in the reaction, to shift the di-substituted amino group from the number 5 carbon atom to the number 2 carbon atom, and to allow the phthalimido group to become attached to the number 5 carbon atom; so that the true reaction which occurs is according to one or the other of the two following equations:

(16)
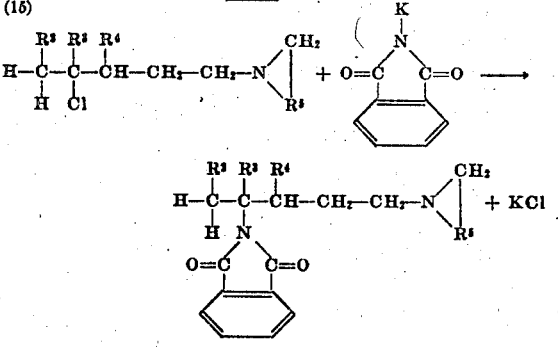

(17)
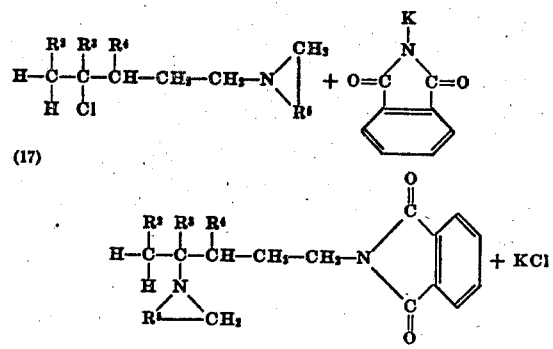

The solvent (say xylene) is removed by evaporation in vacuo, and the phthalimido derivative, of Formula 5 or 6, is recovered from the co-present potassium chloride by extraction with ether or other suitable organic solvent. Upon evaporation of the ether this phthalimido derivative is obtained in the form of an oil, which usually can be vacuum-distilled to purify it. The pure material has an index of refraction of 1.5308 at 20° C. To obtain a solid compound the phthalimido compound may be treated with anhydrous hydrogen chloride or hydrogen bromide to give a well-characterized crystalline hydrohalide of the tertiary amine.

So far as we can discover after a careful search of the literature, all species of this phthalimido derivative are new with us.

*Step 4.—Preparation of saturated diamines; by hydrolysis of phthalimido derivatives produced by Step 3.*

This synthesis is by the following general course:

The phthalimido derivative of Formula 5 or 6, as produced by Step 3, is hydrolyzed with a non-oxidizing mineral acid, such as hydrochloric, hydrobromic, sulfuric, or phosphoric acid. For instance, it is dissolved in an excess of concentrated hydrochloric acid, and heated in an oil bath for several hours at about 130° to 150° C. A hydrolysis occurs which at first was thought to be according to one or the other of the two following equations:

(18)
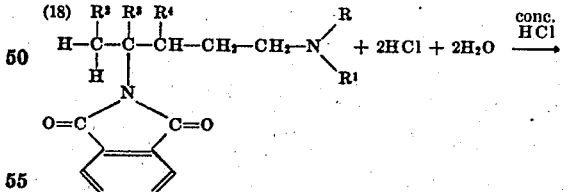
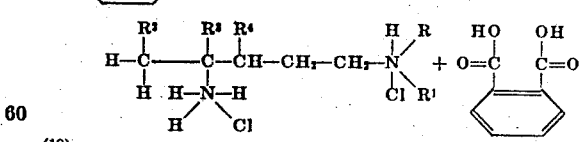

(19)
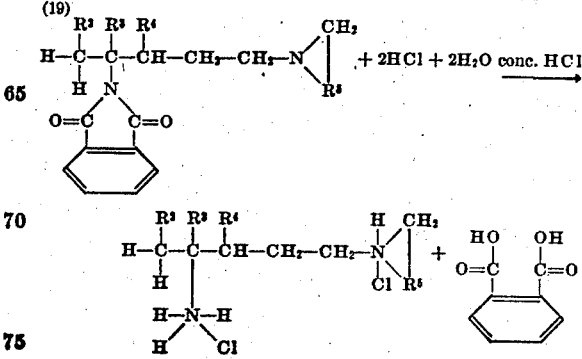

It was found later, however, that the starting compound was the end product of Formula 16 or 17 instead of being the end product of Formula 14 or 15, and that the reaction which actually occurs is according to one or the other of the two following equations:

(20)

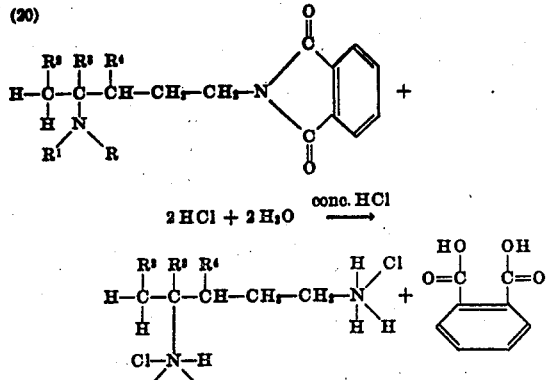

$2HCl + 2H_2O \xrightarrow{conc. HCl}$ (21)

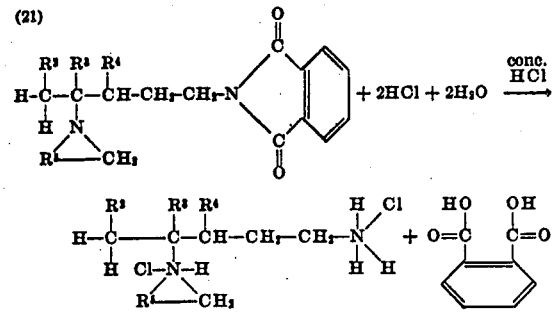

The phthalic acid separates, and is collected on a filter. The filtrate is made strongly alkaline with sodium hydroxide, and extracted with ether. The ether is evaporated, and a residue is obtained, which is the diamine of Formula 7 or 8.

So far as we can discover after careful search, no instances of the saturated diamine of Formula 7 or 8 have heretofore been known.

The substances of Formulas 3 and 7 or 4 and 8 may be used as initial compounds for making various products, such as anti-malarials and other useful medicinal products. For instance, 2 - amino - 5 - diethylaminopentane, in which R and $R^1$ are each ethyl and $R^2$, $R^3$, and $R^4$ are each hydrogen, may be used to furnish the side chain in atabrine and plasmochin.

The following are examples of our invention:

To Make the Unsaturated Amines of Formulas 1 and 2

Example 1

Diethyl-β-chloroethylamine (0.317 mole) is slowly added to a solution of allylmagnesium bromide (0.348 mole) in ether (300 cc.). The reaction mixture is kept refluxing during the addition of the amine, which should take about an hour, and for about three hours longer, desirably under pressure to raise the boiling point of the ether to about 50° C. The reaction mixture is then allowed to stand for a few hours, conveniently overnight, and is then poured on crushed ice (about 300 g.). A concentrated solution of sodium hydroxide (about 40 g.) is then added, and the whole is subjected to steam distillation. The first 500 cc. of distillate contain the reaction product. This distillate is extracted with ether, and the ether extract is dried with sodium sulfate and filtered. The ether is removed by evaporation, and the residue is subjected to distillation at reduced pressure. The distillate (69% of calculated) is the new compound 5-diethylaminopentene-1, which has the following formula:

(22)

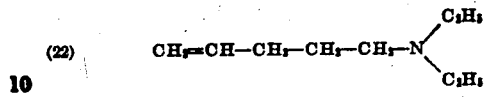

This is a colorless liquid, lighter than water, and has a boiling point of 62.5°-64° C. at 31 mm. of mercury and of 52°-55° C. at 20 mm. of mercury. The index of refraction is $N_D^{20°}$ 1.4300.

5-diethylaminopentene-1 reacts with ethyl iodide to form a quaternary salt of the following formula:

(23)

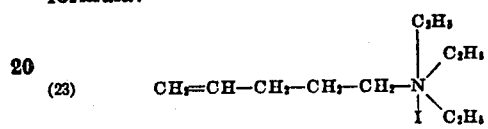

which after crystallization from dry acetone has a melting point of 147°-148° C. 5-diethylaminopentene-1 similarly reacts with halogen acids to form salts. The yield of the 5-diethylaminopentene-1 is about 69% of the calculated.

Example 2

Allyl chloride (0.523 mole) dissolved in ether (200 cc.) is slowly added, under continuous stirring over a period of 3 hours, to magnesium (30 g.) suspended in ether (100 cc.). A white precipitate separates (presumably allyl magnesium chloride), which is kept suspended in the ether by stirring.

To this suspension is slowly added diethyl-β-chloroethylamine (0.296 mole) over a period of about an hour, with the mixture heated to the refluxing temperature during the period of that addition and for at least a half-hour longer. During all this time the mixture is vigorously agitated. Then the mixture is allowed to stand for several hours, conveniently over night; and then is worked up in the manner described in Example 1. The product obtained is 5-diethylaminopentene-1, as in Example 1; but the yield is 81% of the calculated.

Example 3

Diethyl-β-chloroethylamine (0.390 mole) and allyl chloride (0.500 mole) are dissolved in ether (150 cc.). This solution is added slowly, with continuous stirring, to a suspension of magnesium turnings (1.0 mole) in ether (50 cc.). The rate of the addition is so regulated that the mixture is kept refluxing by its own heat of reaction; and it usually requires about two and one-half hours for such addition. The mixture is desirably maintained under reflux conditions and stirred for about one hour longer. Then it is worked up as described in Example 1. The product obtained is 5-diethylaminopentene-1, as in Example 1; and the yield is about 75%-90% of the calculated.

Example 4

2-methylallyl chloride (0.772 mole) dissolved in ether (200 cc.) is slowly added to a suspension of magnesium turnings (50 g.) in ether (100 cc.), over a period of about 3 hours. This forms a white ether-insoluble precipitate, which is presumably 2-methylallylmagnesium chloride. Without isolating this compound, diethyl-β-chloroethylamine (0.331 mole) is slowly added to the mixture, with stirring, and with heating to the refluxing temperature, during the addition. Desirably the addition is timed to require about an hour, and the heating and stirring are continued for about 3 hours longer. The mixture is then poured on ice (300 g.); and is worked up in the same manner as is the product described in Example 1. The compound formed is 5-diethylamino-2-methylpentene-1, which has the following formula:

(24) 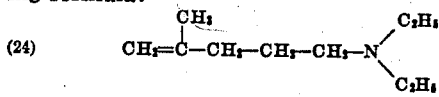

Its boiling point is 75°–77° C. at 25 mm. of mercury. The yield is about 75% of the calculated.

Example 5

Example 4 is repeated, except that crotyl chloride is used instead of 2-methylallyl chloride. The product obtained is 6-diethylaminohexene-2, which has the following formula:

(25) 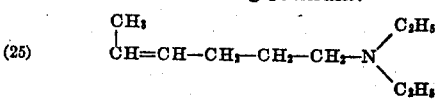

Its boiling point is 73°–75° C. at 31 mm. of mercury. The yield is about 75–78% of the calculated.

Example 6

Example 4 may be repeated, except that cinnamyl chloride is used instead of 2-methylallyl chloride. The resultant compound is 5-diethylamino-1-phenylpentene-1, which has the following formula:

(26) 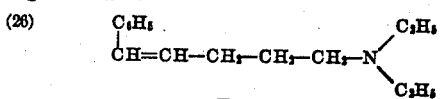

Example 7

Example 4 is repeated, save that 1-methylallyl chloride is used instead of 2-methylallyl chloride. The product obtained thereby is 5-diethylamino-3-methylpentene-1, and has the following formula:

(27) 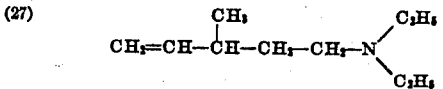

Example 8

Any of the preceding examples may be repeated, but with the ethyl group or a propyl group as any of $R^2$, $R^3$, and $R^4$.

Example 9

Any of the preceding examples may be repeated, save that either or both of R and $R^1$ may be either the methyl group, the propyl group, or other alkyl groups so long as the total carbon atoms in R and $R^1$ does not exceed 8.

Example 10

Any of the preceding Examples 1 to 8 may be repeated, save that either or both of R and $R^1$ is an alicyclic group, such for instance as the cyclopentyl group or the cyclohexyl group.

For instance:

Instead of condensing a diethyl-β-chloroethylamine with the appropriate Grignard reagent, we condense therewith instead ethylcyclohexyl-β-chloroethylamine. This produces compounds of the following general formula:

(28) 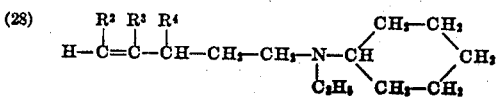

Example 11

Any of the examples 1 to 8 may be repeated, save that instead of condensing diethyl-β-chloroethylamine with the appropriate Grignard reagent, we condense therewith instead N-β-chloroethylpiperidine, N-β-chloroethylmethylpiperidine (whether the methyl group is in the α or the β or the γ position on the piperidine ring), or N-α-chloroethylpyrrolidine. These produce compounds of the following general formulas:

(29) 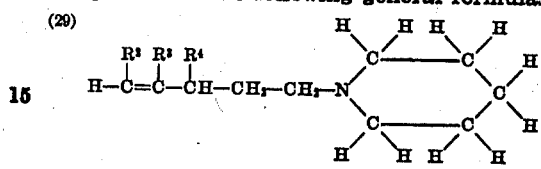

If in such a compound $R^2$, $R^3$, and $R^4$ are all hydrogen atoms, the compound has a boiling point of 89°–95° C. at a pressure of 30–33 mm. of mercury.

(30) 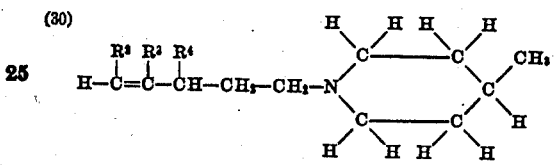

If in such a compound $R^2$, $R^3$, and $R^4$ are all hydrogen atoms, and the methyl group on the piperidine ring is in the γ position, the compound has a boiling point of 92°–97° C. at a pressure of 30–34 mm. of mercury.

(31) 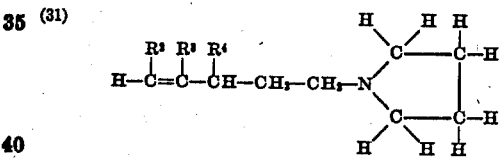

If in such a compound $R^2$, $R^3$, and $R^4$ are all hydrogen atoms, the compound has a boiling point of 80°–86° C. at a pressure of 30–34 mm. of mercury.

To Make the Saturated Halides of Formulas 3 and 4

Example 12

Any of the unsaturated amines produced by any of Examples 1 to 11 inclusive may be treated with a hydrogen halide, in the presence of small quantities of anhydrous ferric chloride (or bromide) or anhydrous aluminum chloride (or bromide), to produce an addition at the double bond, and thus to produce the saturated halides of formulas 3 and 4 above.

For instance:

a. To the 5-diethylaminopentene-1 of Examples 1, 2, and 3 is added 0.3% to 1.0% of anhydrous ferric chloride. This mixture is put into a tube; and dry hydrogen chloride or dry hydrogen bromide is passed into the tube until a gain in weight corresponding to 2.1 to 3.0 mole equivalents has taken place, with the tube chilled to and maintained chilled at a temperature of about −95° C. if hydrogen chloride is used and at a temperature of about −70° C. if hydrogen bromide is used. The tube is then sealed, allowed to come to room temperature, and then heated to about 40° C. for 3 to 8 hours. The tube is then cooled, and opened. The excess halogen halide is then removed under diminished pressure. This yields the 5-diethylamino-2-chloropentane hydrochloride or 5-diethylamino-2-bromopentane hydrobromide, according to which hydrogen halide was used.

If the free base is desired, the hydrochloride or hydrobromide is dissolved in a small amount of water, cooled, treated with sodium hydroxide or sodium carbonate, and extracted with ether. Upon evaporation of the ether, the crude 5-diethylamino-2-chloropentane or 5-diethylamino-2-bromopentane is obtained. This can be purified by vacuum fractionation. The yield is about 85% of the calculated. The two compounds thus obtained have the following formula:

(32) 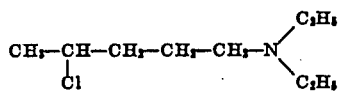

(33) 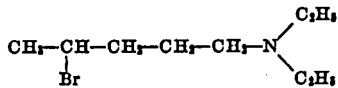

These two particular compounds are not new with us; but our syntheses of them is new.

When these compounds are made by this synthesis, they agree in all their physical characteristics with those of the same formulas which have been described in the literature.

b. If instead of starting with the 5-diethylaminopentene-1 of Examples 1, 2, and 3, we start instead with the products of Examples 4, 5, 6, 7, 8, 9, 10, or 11, we not only have new syntheses but also get new products. These include the following:

5 - diethylamino - 2 - methyl-2-chloropentane, having the following formula:

(34) 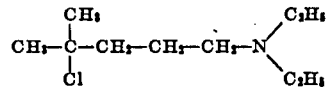

5 - diethylamino - 2 - methyl-2-bromopentane, having the following formula:

(35) 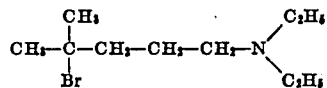

6-diethylamino-3-chlorohexane, having the following formula:

(36) 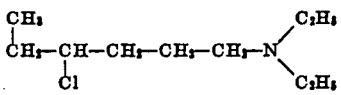

6-diethylamino-3-bromohexane, having the following formula:

(37) 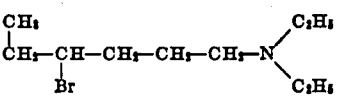

5 - diethylamino - 1 - phenyl-1-chloropentane, having the following formula:

(38) 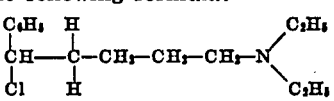

5 - diethylamino - 1 - phenyl-1-bromopentane, having the following formula:

(39) 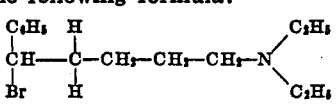

5 - diethylamino - 3 - methyl-2-chloropentane, having the following formula:

(40) 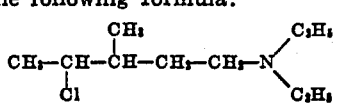

5 - diethylamino - 3 - methyl-2-bromopentane, having the following formula:

(41) 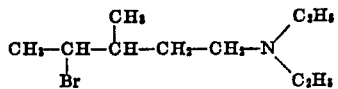

5 - diethylamino - 2 - propyl-2-chloropentane, having the following formula:

(42) 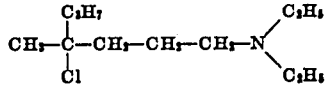

5 - diethylamino - 3 - ethyl-2-bromopentane, having the following formula:

(43) 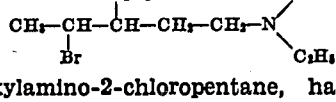

5-dialkylamino-2-chloropentane, having the following formula:

(44) 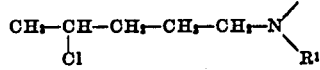

with R and $R^1$ representing methyl or propyl or butyl groups.

5-dialkylamino-2-bromopentane, having the following formula:

(45) 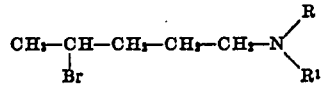

with R and $R^1$ representing methyl or propyl or butyl groups.

5-ethylcyclohexylamino - 1 - $R^2$ - 2 - $R^3$-3-$R^4$-2-chloropentane, having the following formula:

(46) 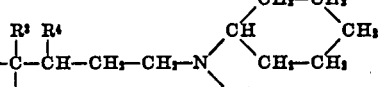

5-ethylcyclohexylamino - 1 - $R^2$ - 2 - $R^3$-3-$R^4$-2-bromopentane, having the following formula:

(47) 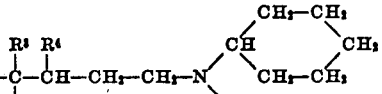

5-piperidino-2-chloropentane, having the following formula:

(48) 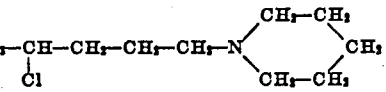

5-pyrrolidino-2-bromopentane, having the following formula:

(49) 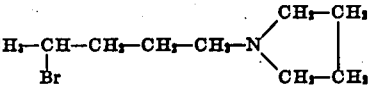

TO MAKE THE PHTHALIMIDO DERIVATIVES OF FORMULAS 5 AND 6

*Example 13*

The saturated halides, of any species, as obtained under Example 12, may be used as a source to produce new phthalimido derivatives, of formulas 5 and 6 above.

For instance:

a. Potassium phthalimide (17.5 g.) is suspended in dry xylene (30 cc.) and heated to 120°–130° C., with constant stirring. To this hot suspension is slowly added 5-diethylamino-2-chloropentane (16.5 g.) over a period of about 20 minutes. Then the bath temperature is raised to about 160°–165° C., under continuous stirring, and maintained at that temperature for about 4 to 5 hours. The reaction mixture is allowed to cool; and the reaction product is extracted three times with small quantities of ether to separate it from the potassium chloride formed in the reaction. The ether is removed, by evaporation. Then the residue is fractionated by distillation in vacuo and the fractions boiling at 200°–210° C. at 14 mm. of mercury is collected. This fraction, which is a light, clear, orange-yellow oil, is the 5-phthalimido-2-diethylaminopentane, which has the following formula:

(50)
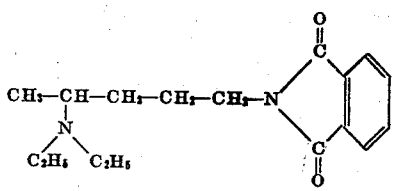

The yield is 19 g. To further characterize the compound, its hydrochloride may be formed, by usual methods, to produce a water-soluble non-hygroscopic salt, in the form of colorless needles, with a melting point of 176°–177° C.

b. The other phthalimido compounds of the products of Example 11 may be obtained in corresponding manner. The formulas of some of them are as follows:

(51)
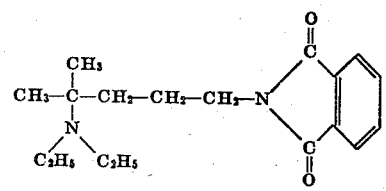

(52)
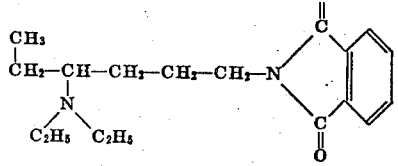

(53)
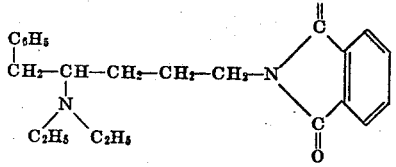

(54)
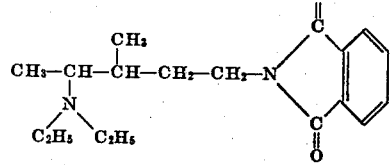

(55)
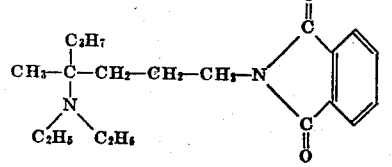

(56)
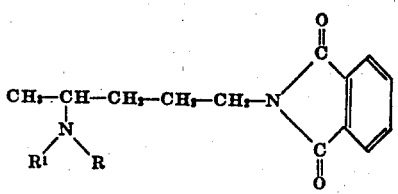

(57)
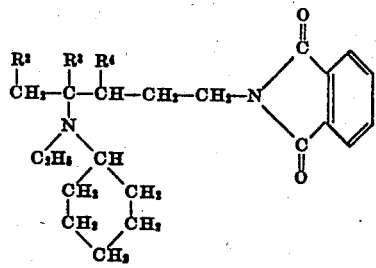

(58)
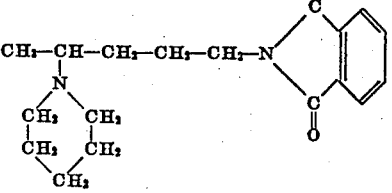

(59)
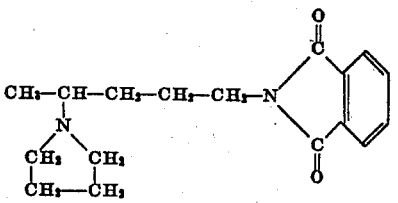

All these phthalimido compounds are new compounds.

To Make the Saturated Diamines of Formulas 7 and 8

Example 14

The phthalimido compounds, of any species, as obtained under Example 13, may be used as a source for the production of the saturated diamines of Formulas 7 and 8, the final products of the present application.

For instance:

a. 5-phthalimido-2-diethylaminopentane (35 g.) dissolved in concentrated hydrochloric acid (80 cc.) is heated in an oil bath at 130°–140° C. for six hours. Phthalic acid separates; more concentrated hydrochloric acid (20 cc.) is added, and the mixture is allowed to stand for 4 hours. The phthalic acid is collected on a filter, washed three times with dilute hydrochloric acid; and the combined filtrates are made alkaline with 40% sodium hydroxide solution (50 cc.) and extracted with ether, preferably in a continuous extractor. The ether is evaporated, and the residue is subjected to fractional distillation. 5-amino-2-diethylaminopentane in 85% yield is thus obtained. It has the following formula:

(60)
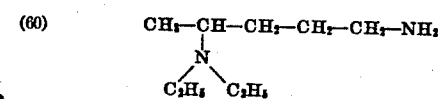

b. The other phthalimido compounds, as given under Example 13b, may be treated in an exactly similar manner, to yield compounds which have structures as shown in Formulas 7 and 8. All these substances are new.

The formulas of some of these new fourth intermediates are as follows:

(61) 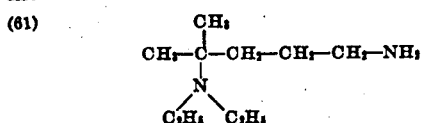

(62) 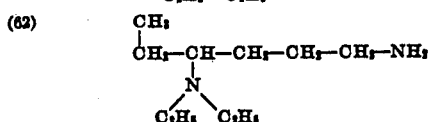

(63) 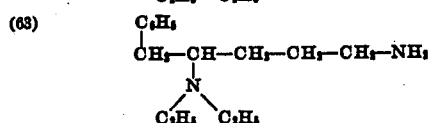

(64) 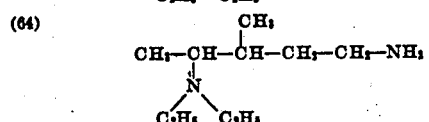

(65) 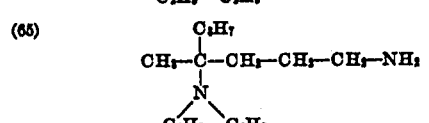

(66) 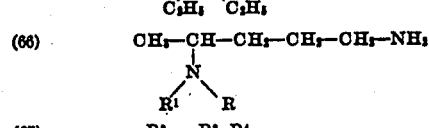

(67) 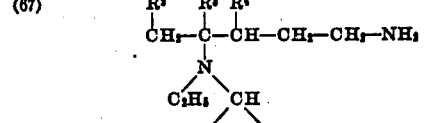

(68) 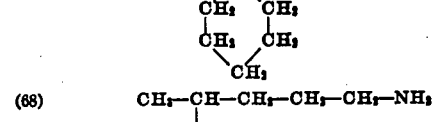

(69) 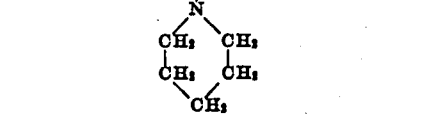

The various saturated diamines of Formulas 7 and 8 above may be used for the production of other compounds, such as anti-malarials and other useful medicinal products.

Further, the saturated halides of Formulas 3 and 4 above can be used directly for other purposes than as sources of the phthalimido derivatives of Formulas 5 and 6 above, as to produce plasmochin, atabrine, and various other medicinal compounds.

We claim as our invention:

1. The process of producing a new phthalimido compound of the class consisting of compounds of the following general formula:

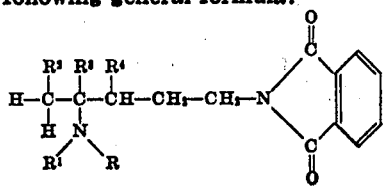

in which R and $R^1$ represent radicals of the class consisting of (a) alkyl radicals which together have not to exceed 8 carbon atoms, and (b) alicyclic radicals, and $R^2$, $R^3$, and $R^4$ each represents a member of the class consisting of hydrogen and alkyl radicals of not to exceed 3 carbon atoms, and of compounds of the following general formula:

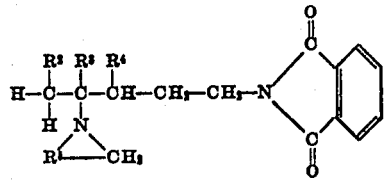

in which $R^5$ represents a polymethylene radical which has not less than three and not more than four carbon atoms and $R^2$, $R^3$, and $R^4$ have the same meaning as before; which consists in causing a reaction between a compound of the class consisting of compounds of the following general formula:

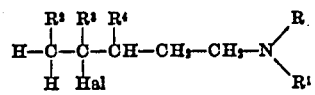

and of compounds of the following general formula:

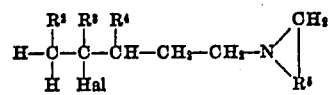

in which formula R, $R^1$, $R^2$, $R^3$, $R^4$, and $R^5$ have the same meaning as before, and in which Hal is one of the halogens chlorine and bromine, and an alkali-metal phthalimide.

2. The new phthalimido compounds of the class consisting of compounds of the following general formula:

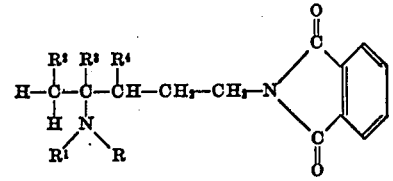

in which R and $R^1$ represent radicals of the class consisting of (a) alkyl radicals which together have not to exceed 8 carbon atoms, and (b) alicyclic radicals, and $R^2$, $R^3$, and $R^4$ each represents a member of the class consisting of hydrogen and alkyl radicals of not to exceed 3 carbon atoms, and of compounds of the following general formula:

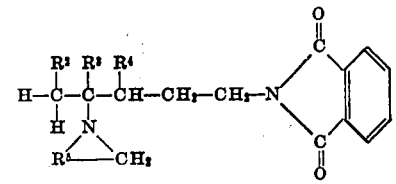

in which $R^5$ represents a polymethylene radical which has not less than three and not more than four carbon atoms and $R^2$, $R^3$, and $R^4$ have the same meaning as before.

3. The process as set forth in claim 1, in which each of $R^2$, $R^3$, and $R^4$ is hydrogen.

4. The process as set forth in claim 1, in which the final compound is of the first formula and the initial compound is of the third formula and each of R and $R^1$ is ethyl.

5. The process as set forth in claim 1, in which the final compound is of the first formula and the initial compound is of the third formula, each of $R^2$, $R^3$, and $R^4$ is hydrogen, and each of R and $R^1$ is ethyl.

6. The process as set forth in claim 1, in which each of $R^2$ and $R^4$ is hydrogen, and $R^3$ is methyl.

7. The process as set forth in claim 1, in which each of $R^3$ and $R^4$ is hydrogen, and $R^2$ is methyl.

8. The new compounds as set forth in claim 2, in which each of $R^2$, $R^3$, and $R^4$ is hydrogen.

9. The new compounds as set forth in claim 2, in which the compounds are of the first formula and each of R and $R^1$ is ethyl.

10. 5-phthalimido-2-diethylaminopentane.

11. The new compounds as set forth in claim 2, in which each of $R^2$ and $R^4$ is hydrogen, and $R^3$ is methyl.

12. The new compounds as set forth in claim 2, in which each of $R^3$ and $R^4$ is hydrogen, and $R^2$ is methyl.

13. 5-phthalimido-2-methyl-2-diethylaminopentane.

14. 6-phthalimido-3-diethylaminohexane.

MORRIS S. KHARASCH.
CHARLES F. FUCHS.

REFERENCES CITED

The following references are of record in the file of this patent:

UNITED STATES PATENTS

| Number | Name | Date |
| --- | --- | --- |
| 2,343,198 | Moore | Feb. 29, 1944 |

Certificate of Correction

Patent No. 2,432,905.　　　　　　　　　　　　　　　　December 16, 1947.

MORRIS S. KHARASCH ET AL.

It is hereby certified that errors appear in the printed specification of the above numbered patent requiring correction as follows:

Column 1, line 43, before the word "having" insert *and of amines*; column 6, lines 33, 34, and 35, the sentence "Preparation of saturated diamines; by hydrolysis of phthalimido derivatives produced by Step 3" should be printed in italics; column 10, line 10, for "N-$\alpha$-" read *N-$\beta$-*;

and that the said Letters Patent should be read with these corrections therein that the same may conform to the record of the case in the Patent Office.

Signed and sealed this 15th day of February, A. D. 1949.

[SEAL]

THOMAS F. MURPHY,
*Assistant Commissioner of Patents.*